Oct. 25, 1966   J. E. MULLER   3,280,432
COLLAPSING CORE INJECTION MOLD
Filed Nov. 21, 1963   2 Sheets-Sheet 1
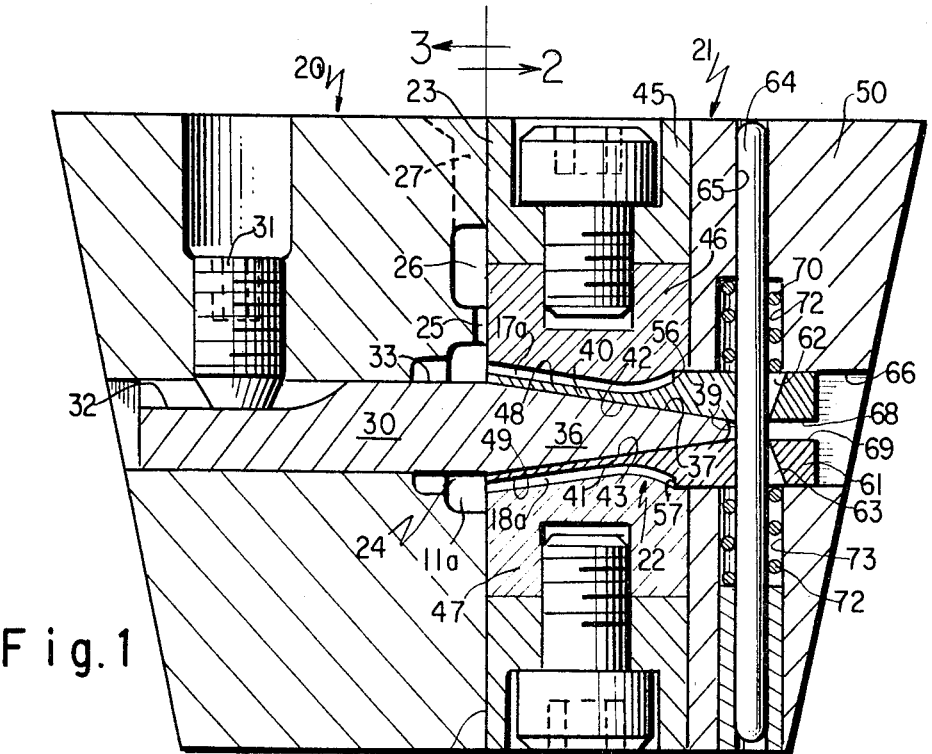
Fig.1
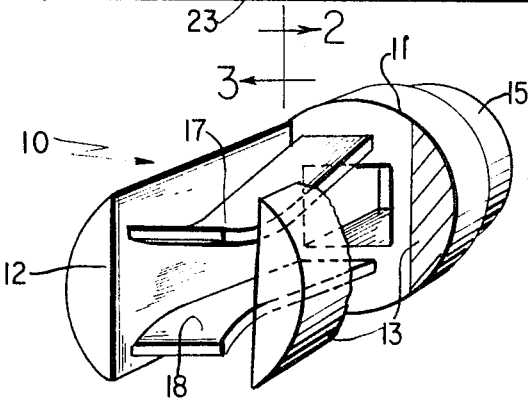
Fig. 4
Fig. 5
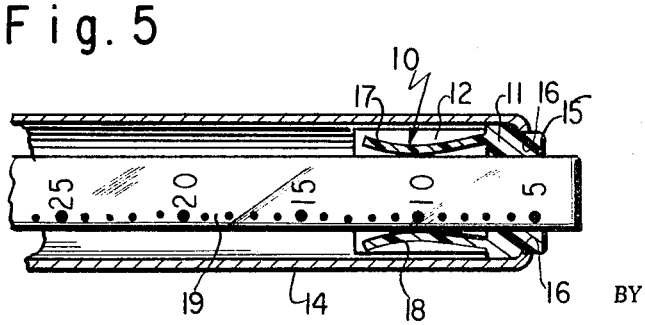
INVENTOR.
JOHN E. MULLER
BY
Albert C. Johnston
ATTORNEY Oct. 25, 1966  J. E. MULLER  3,280,432
COLLAPSING CORE INJECTION MOLD
Filed Nov. 21, 1963  2 Sheets-Sheet 2

INVENTOR.
JOHN E. MULLER
BY Albert C. Johnston
ATTORNEY

United States Patent Office 3,280,432
Patented Oct. 25, 1966

3,280,432
COLLAPSING CORE INJECTION MOLD
John E. Muller, Monroe, N.Y., assignor to Acme Air Appliance Co., Inc., Hackensack, N.J., a corporation of New York
Filed Nov. 21, 1963, Ser. No. 325,389
15 Claims. (Cl. 18—42)

This invention relates to a collapsing core injection mold for molding thermoplastic materials or the like and, more particularly, to a mold for the injection molding of articles having side surfaces thereof molded with recesses or other contours which ordinarily would prevent the required removal of the article from the molding cavity.

It is an object of the invention to provide a mold for work of that nature which forms the required molding cavity and frees the molding formed in it for quick removal from the mold by the relative movement of external mold sections to and from closed position, without need for manual handling of the cavity-forming or core elements required to form the recessed or contoured surfaces of the molded articles.

Another object is to provide a mold construction for injection molding which is capable of producing small rigid or semi-rigid molded articles having configurations not available by the use of molds of known construction.

A particular object of the invention is to provide an injection mold construction suitable for the molding of an especially formed annular base cap to be used as an element of an air pressure gauge.

According to the invention, an injection mold fulfilling these and other desirable objects is provided by a distinctive arrangement of relatively movable mold sections, hollowed to form the outer surface of the required molding cavity, with a core member or members disposed in and movable relative to a hollow in one of the mold sections and a mandrel carried by another of the mold sections and acting as the mold is closed to displace the core member or members laterally and thus form the molding cavity with an elevated or contoured surface that gives it the internal configuration required for the molding of the desired article. A given mold structure may be made to comprise any desired number of duplications of this arrangement, each suitably connected with a source of injection molding material, as by a sprue channel leading to the cavity along a parting line of the mold sections, so that a plurality of the desired articles will be molded in each molding operation.

According to a further aspect of the invention, the core member or members are released for movement away from the molding upon the opening movement of the mold sections, so that the molding then can be removed from the mold without obstruction by the core member or members and the mold then may be immediately re-closed to re-form the required molding cavity and receive another injected charge of the plastic material.

By forming each core member with a cam surface coacting with a wedging surface on the mandrel and also forming it with an extended, spring-pressed end portion whereby it is mounted for displacement, upon movement of the mandrel, in a direction transverse to the direction of parting movement of the mold sections, the molding cavity not only is formed to the required configuration as the mold sections are moved together but also is opened at its inner side, as they are separated, through a displacement of each core member produced by the spring acting upon its extended end portion. The mounting and the manner of movement of each core member enable it to be formed with any of a great variety of configurations so as to produce any of a great variety of recessed, undercut or otherwise uneven side surfaces in the molded articles and still to free itself from the molding so that the molding will be ready for removal when the mold is opened.

The foregoing and other objects, features and advantages of the invention will be apparent from the following detailed description and the accompanying drawings of an illustrative embodiment of the invention.

In the drawings:

FIG. 1 is a view in enlarged cross section of a mold constructed according to the invention;

FIG. 4 is an isometric view, several times enlarged, of a combined base cap and friction device for an air pressure gauge, as produced in the particular form of mold here shown; and FIG. 5 is a partial view of the base or pressure-indicating end of an air gauge employing the molded article.

Figure 3:
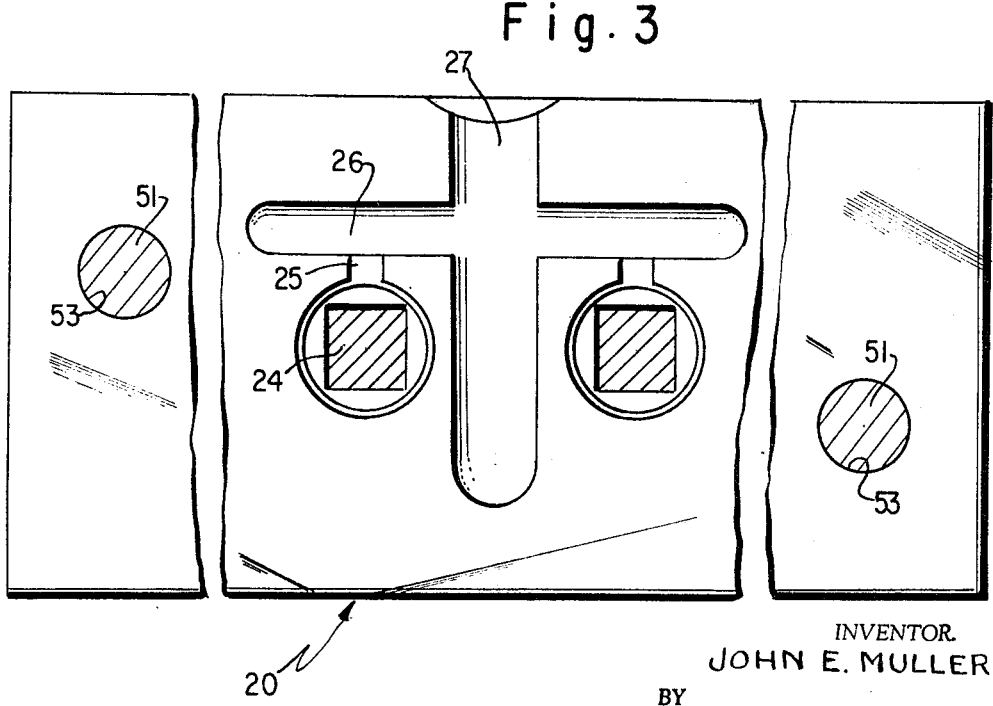
FIG. 3 is a view similar to that of FIG. 2 but of thte other mold section, taken in the direction of the arrows 3—3.

The mold of the illustrative embodiment of the invention is adapted to produce a combined base cap and friction device of the form shown at 10 in FIG. 3, for use in the base end of a pencil-type air pressure gauge as indicated in FIG. 4.

As there shown, the molded article 10 has a cylindrical base 11 formed integrally with opposite side members 12 and 13 so as to fit inside a cylindrical barrel or housing 14 of the air gauge. An end flange 15 of base 11 protrudes through a circular opening 16 at the end of the housing, and curved resilient fingers 17 and 18 protrude forwardly from base 11 between the side members 12 and 13 in position to bear at high points of their convexly curved inner surfaces against opposite side faces of a pressure indicating plunger 19 of square cross section that slides axially in the housing. The side members and the fingers and a bore of square cross section extending axially through the base and its flange define a passageway for sliding movement of the plunger 19, while the convex inner surfaces of the resilient fingers 17 and 18 exert a desired frictional resistance to such movement and serve to hold the plunger temporarily in any position to which it may be moved by air pressure acting upon its end (not shown) at the head of the gauge.

It will be evident that while an article composed of the base 11 and side members 12 and 13 would be moldable in and removable from an injection molding cavity formed in internally cored parting mold sections of conventional construction, a molding cavity so formed would not be practicable for molding the article 10 having curved fingers 17 and 18 formed integrally with the base 11. These fingers present surface contours of varying height, some recessed and some elevated relative to others, which would be confined between the outer and inner (core) surfaces of the molding cavity so as to prevent the required removal of the molded article from the cavity at the parting line of the mold sections. A similar problem would exist in the production of various other molded articles, such, for example, as rings, sleeves, or the like, having internal screw threads or other uneven configurations along a side surface.

Figure 2:
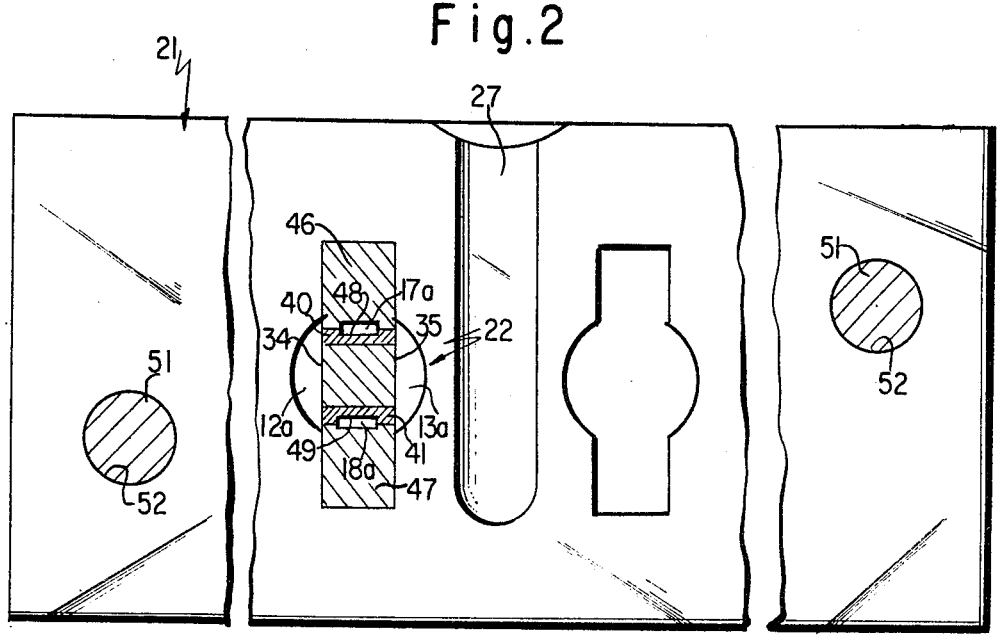
FIG. 2 is an enlarged elevational view of one of the mold sections, partly in cross section, taken along the parting line in the direction of the arrows 2—2 of FIG. 1.

According to the present invention, as shown in FIGS. 1, 2 and 3, the problem is overcome by an injection mold construction making use of mold sections 20 and 21 which meet at a parting line 23 and which can be continually closed, filled, opened and emptied, in conventional manner, for the rapid and economical reproduction of the molded article 10. These sections can be provided with any desired number of molding cavities formed, for example, as the cavity 24 seen in FIGS. 1 and 2. Two such cavities are shown in FIGS. 2 and 3.

The molding cavity 24 comprises several communicating chambers formed in the two mold sections. An annular head chamber 11a in section 20 has the configuration of the base 11 of the article 10. Opposite side chambers 12a and 13a (FIG. 2) connecting with chamber 11a are formed in mold section 21 to the configurations of the side members 12 and 13 of the article. Opposite finger chambers 17a and 18a likewise connecting with chamber 11a are formed in mold section 21 to the configurations of the curved fingers 17 and 18.

The thermoplastic resin or other suitable plastic material to be molded into the article is injected in conventional manner into the cavity 24 of the closed mold, through branches 25 and 26 of a sprue channel 27 leading into the cavity along the parting line 23.

The several chambers constituting the molding cavity are formed and are openable for quick removal of each molding in undamaged condition, by the structures now to be described.

Mold section 20 has a mandrel pin 30 fixed within it, as by a set screw 31 bearing against a flattened surface 32 at the backward end of the pin, to serve in this embodiment both as a mandrel for positioning relatively movable core members 40 and 41 located in the hollow 22 of mold section 21 and as a core element to form inner surfaces of the base 11 and the side members 12 and 13 of the molded article. For the latter purpose, the pin 30 presents a surface 33 of square cross section inside the head chamber 11a and presents in the hollow 22 flat surfaces 34 and 35 (FIG. 2) defining inner sides of the side members 12a and 13a.

The flat surfaces 34 and 35 are formed along opposite sides of a tapered forward end 36 of the mandrel pin 30. This tapered end has upper and lower surfaces 37 and 38 which slope forwardly in converging relation from the parting line 23 to a tip 39 of the pin, so as to constitute wedging surfaces coacting with cam surfaces 42 and 43, respectively, formed along the inner sides of the movable core members 40 and 41.

The second mold section 21 comprises two separable body members 45 and 50 which normally are held together as a unit and are kept in proper alignment by dowel pins 51 on member 50 which pass through bores 52 (FIG. 2) in member 45. The dowel pins extend forwardly beyond the parting line 23 at the face of member 45 and serve to align the closing mold sections by fitting into sockets 53 (FIG. 3) formed in section 20.

The hollow 22 in mold section 21 is defined by cylindrical surfaces of body member 45, which form the outer sides of side chambers 12a and 13a, and by the faces of upper and lower dies 46 and 47 which are set into this member by cap screws. The faces of these dies have a longitudinally curved configuration and are recessed, as seen in FIGS. 1 and 2, to constitute outer surfaces of the finger chambers 17a and 18a.

The inner surfaces of the finger chambers are formed by contoured molding surfaces 48 and 49 extending along and recessed in the outer sides of the core member 40 and 41. As seen in FIG. 2, these surfaces are bordered laterally by elevations or ribs which extend along the core members and mate with similar lateral elevations or ribs on the dies 46 and 47, thereby closing the sides of the finger chambers and separating them from the side chambers 12a and 13a when the mold is closed.

As seen in FIG. 1, the wedging surfaces of the mandrel pin 30 bear against the cam surfaces of the core members and hold these members in the required molding position when the mold is closed. Ledges 56 and 57 at the backward ends of core surfaces 48 and 49 then close the ends of the fingers chambers and bear against seats on the dies 46 and 47.

Beyond those ledges, the core members 40 and 41 have extended end portions 60 and 61 by which they are mounted in body member 50 for movement away from the parts of a molding formed on their surfaces 48 and 49, in a direction transverse to the parting movement of the mold sections, when the mold is opened for the removal of a molding produced in the cavity 24. As shown in FIG. 1, these extended end portions are formed with openings 62 and 63 which receive a mounting pin 64 located in a bore 65 extending through the body member 50. The forward wall of each opening lies flush against the mounting pin, while the backward wall thereof lies next to the mounting pin at its inner end but slopes away from the pin towards its outer end, so that each core member can be slid along the mounting pin and also can be pivoted on the pin in the direction away from a molding formed against its molding surface.

The extended end portions of the core members are located in an extension 66 of the hollow 22 in body member 45. They have base surfaces 68 and 69 which are spaced apart when the molding surfaces 48 and 49 of the respective core members are disposed in cavity-forming position.

It will be evident that by virtue of the mounting and the arrangement of the core members, these members, when freed from constraint by retraction of the mandrel end 36 away from their inner surfaces, may be withdrawn from the hollow 22 and from the contoured fingers and other parts of a molding formed in the molding cavity, by moving body member 50 away from body member 45. The relatively elevated portions of the molding surfaces of the core members then are retracted from parts of the molding formed against relatively recessed portions of those surfaces, by sliding or tilting or both sliding and tilting on their mounting pin 64 in a direction transverse to the parting movement of the mold sections.

As further seen in FIG. 1, the core members are continuously biased in that direction by the force of compression springs 70 and 71 acting upon the outer sides of their end portions 60 and 61. Thus, they normally are self-releasing from the fingers molded in cavity channels 17a and 18a, upon being freed for transverse movement by retraction of the mandrel. Accordingly, when the mold sections are separated to open the mold for the removal of a molding formed in the cavity 24, the mandrel end 36 moves away from the core members and frees them for inward movement, and the springs 70 and 71 acting upon their backward ends then displace the core members inwardly toward the center of the hollow in body member 45. The molding then is released for removal from the mold without obstruction by the core members. Ordinarily it may be removed simply by grasping and pulling upon its sprue formed in the sprue channel.

After removal of the molding, the mold sections are simply moved together so as to meet again at the parting line 23 and re-form the molding cavity in readiness for another injection molding operation. In the course of this closing movement, the tip 39 of the mandrel pin moves along the axis of the molding cavity to enter between the free ends of the core members 40 and 41, which ends are spaced apart even when the base surfaces 68 and 69 of these members are in butting relation; and then the wedging surfaces 37 and 38 of the mandrel pin, by moving along the cam surfaces 42 and 43 of the core members, thrust the core members transversely back along their mounting to their cavity-forming position against the force of the springs 70 and 71.

The springs 70 and 71 as shown are coiled springs which surround the mounting pin 64 and are seated in chambers 72 and 73 formed in body member 50 at opposite sides of the hollow extension 66.

It will be understood that the invention provides structures and relationships of structures which may be embodied in various forms of apparatus and used for the molding of various articles differing from the particular embodiment hereinabove described and illustrated in the drawings. The invention is not intended to be restricted to the form or other particulars of this illustrative embodi-

What is claimed is:

1. An injection mold comprising meeting mold sections hollowed from a parting line thereof to form outer surfaces of an injection molding cavity, said sections being separable at said line to open said cavity for the removal of a molding therefrom, a core member in the hollow of one of said sections and extending generally along the direction of the parting movement of said sections and presenting at one side of said member a molding surface to form an inside surface of said cavity, means mounting said core member for movement in said hollow in a path generally transverse to said direction of parting movement, a positioning surface in said hollow on a side of said core member opposite to its said one side, and positioning means on the other of said sections and movable into and from said hollow in engagement with said positioning surface for disposing said core member in cavity-forming position when said sections are in meeting relation and for freeing said core member for movement in said path away from said position.

2. An injection mold according to claim 1, and means in said one section operative when said core member is freed by said positioning means for displacing said core member away from said position whereby to release a molding formed in said cavity for removal from the mold.

3. An injection mold according to claim 1, said core member having an end portion extended beyond said cavity, and a spring acting continuously upon said end portion to urge said core member away from cavity-forming position.

4. An injection mold according to claim 1, said positioning means being fixed to and movable with the other of said sections so as to dispose said core member in cavity-forming position as said sections are moved together and to free said core member for movement in said path away from said position as said sections are moved apart.

5. An injection mold according to claim 1, said positioning means comprising a mandrel carried by said other mold section to extend into said hollow, there being coacting wedging and cam surfaces respectively on said mandrel and on said opposite side of said core member for displacing said core member in a direction transverse to the movement of said mandrel as said sections are moved together.

6. An injection mold according to claim 5, said mandrel having other surfaces thereon which extend into said hollow and form inside molding surfaces of said cavity when said sections are in meeting relation.

7. An injection mold according to claim 1, said core member having an end portion extended beyond said cavity and formed with a transverse opening therethrough, said mounting means comprising a mounting pin extending through said opening and upon which said core member slides as it is moved in said path.

8. An injection mold comprising meeting mold sections hollowed from a parting line thereof to form outer surfaces of an injection molding cavity, said sections being separable at said line to open said cavity for the removal of a molding therefrom, oppositely facing core members in the hollow of one of said sections and each presenting at its outer side a molding surface to form an inside surface of said cavity, means mounting each said core member for movement in said hollow in a path transverse to the parting movement of said sections, and positioning means respectively on the other of said sections and on inner sides of said core members for thrusting said members in opposite directions to cavity-forming position when said sections are moved together to close said cavity and freeing said members for converging movements away from said position when said sections are moved apart.

9. An injection mold according to claim 8, each said core member being mounted for sliding movement to said position by the action of said positioning means and for both sliding and pivotal movement away from said position.

10. An injection mold comprising meeting mold sections hollowed from a parting line thereof to form outer surfaces of an injection molding cavity, said sections being separable at said line to open said cavity for the removal of a molding therefrom, oppositely facing core members in the hollow of one of said sections and each presenting at its outer side a molding surface to form an inside surface of said cavity, means mounting each said core member for movement in said hollow in a path transverse to the parting movement of said sections, and positioning means respectively on the other of said sections and on inner sides of said core members for thrusting said members in opposite directions to cavity-forming position when said sections are moved together to close said cavity and freeing said members for converging movements away from said position when said sections are moved apart, said one mold section comprising separable forward and backward body members respectively containing said hollow and an extension of said hollow beyond said cavity, each said core member having an end portion extended into said extension and being mounted as aforesaid by means in said backward member engaging said end portion, said core members being movable inwardly away from cavity-forming position and backwardly out of said hollow by separation of said body members when said sections are parted.

11. An injection mold according to claim 10, said mounting means comprising a mounting pin in said backward member extending through an opening in each said end portion and upon which each said core member is slidable laterally to cavity-forming position and is both slidable and pivotable laterally away from said position.

12. An injection mold according to claim 11, and spring means in said backward member bearing continuously against said end portions to displace said core members away from said position when they are freed for converging movements.

13. An injection mold according to claim 12, said positioning means comprising a mandrel carried by said other mold section to extend into said hollow and coacting wedging and cam surfaces respectively on opposite sides of said mandrel and on said inner sides of said core members for displacing said core members to said position against the force of said spring means as said sections are moved together.

14. An injection mold according to claim 13, said wedging surfaces sloping to a tip at the end of said mandrel and said core members in converged relation having ends spaced apart in said hollow to receive said tip therebetween as the mold sections are moved together.

15. An injection mold according to claim 14, said mandrel being disposed in a hollow of said other mold section and having therein, and also along its sides between said wedging surfaces, other surfaces which form molding surfaces of said cavity when said sections are in meeting relation.

References Cited by the Examiner
UNITED STATES PATENTS

| 2,994,921 | 8/1961 | Hultgren | 18—42 |
| 3,049,759 | 8/1962 | Eberhardt | 18—42 |
| 3,060,509 | 10/1962 | McCubbins | 18—45 X |
| 3,074,113 | 1/1963 | Specht | 18—45 X |
| 3,138,827 | 6/1964 | Hamilton | 18—45 X |
| 3,226,771 | 1/1966 | Szugda | 18—42 |

J. SPENCER OVERHOLSER, *Primary Examiner.*

J. H. FLINT, *Examiner.*